US009712733B2

(12) United States Patent
Cao

(10) Patent No.: US 9,712,733 B2
(45) Date of Patent: Jul. 18, 2017

(54) METHOD AND APPARATUS FOR LIVE CAPTURE IMAGE-LIVE STREAMING CAMERA

(76) Inventor: Jianhua Cao, Walnut, CA (US)

( * ) Notice: Subject to any disclaimer, the term of this patent is extended or adjusted under 35 U.S.C. 154(b) by 1017 days.

(21) Appl. No.: 13/199,559

(22) Filed: Sep. 2, 2011

(65) Prior Publication Data

US 2011/0317022 A1 Dec. 29, 2011

Related U.S. Application Data

(63) Continuation-in-part of application No. 12/583,299, filed on Aug. 17, 2009.

(51) Int. Cl.
  *H04N 5/232* (2006.01)
  *H04N 7/18* (2006.01)

(52) U.S. Cl.
  CPC ......... *H04N 5/232* (2013.01); *H04N 5/23206* (2013.01); *H04N 7/181* (2013.01)

(58) Field of Classification Search
  CPC .................................................. H04N 7/17318
  USPC .................................................. 348/211.3
  See application file for complete search history.

(56) References Cited

U.S. PATENT DOCUMENTS

| 7,246,147 | B2* | 7/2007 | Kim et al. | 709/203 |
|---|---|---|---|---|
| 8,656,442 | B1* | 2/2014 | Clarke | H04L 65/605 709/203 |
| 8,694,612 | B1* | 4/2014 | Schoenberg | H04N 21/2225 709/219 |
| 2001/0019360 | A1* | 9/2001 | Tanaka et al. | 348/211 |
| 2001/0037461 | A1* | 11/2001 | Conrath | 713/201 |
| 2002/0052917 | A1* | 5/2002 | Ihara | G06Q 30/0284 709/203 |
| 2002/0122073 | A1* | 9/2002 | Abrams | G06F 17/30884 715/838 |
| 2002/0152313 | A1* | 10/2002 | Nishimura | G06F 9/5027 709/227 |

(Continued)

FOREIGN PATENT DOCUMENTS

| CN | 201282536 Y | * | 7/2009 | ............... G06F 9/44 |
|---|---|---|---|---|
| CN | 102023860 A | * | 4/2011 | ............. H04N 19/40 |
| WO | WO 2006086718 A1 | * | 8/2006 | ............... H04N 7/18 |

OTHER PUBLICATIONS

CN 201282536 Y; Jul. 29, 2009; English Translation.*

(Continued)

*Primary Examiner* — Roberto Velez
*Assistant Examiner* — Cynthia Segura
(74) *Attorney, Agent, or Firm* — Raymond Y. Chan; David and Raymond Patent Firm

(57) ABSTRACT

A live image transferring method includes the steps of capturing live image information by one or more live image devices, wherein the live image information is captured in raw format and is continuously transferred to one or more platforms in a live manner; cloning the live image information at the platform, wherein when the live image information is cloned at the platform, the live image information is converted from the raw format into a web viewable format and an embed code is generated corresponding to the live image information at the same time; and enabling one or more users to use the embed code in order to broadcast the live image information over any website. The user is able to copy-and-paste the embed code at the personal website to live stream the live image information from the live image device.

34 Claims, 8 Drawing Sheets

(56) References Cited

U.S. PATENT DOCUMENTS

| | | | | |
|---|---|---|---|---|
| 2003/0182451 | A1* | 9/2003 | Grass | H04L 29/06 709/246 |
| 2007/0200917 | A1* | 8/2007 | Chen | H04M 1/72522 348/14.01 |
| 2007/0252897 | A1* | 11/2007 | Hata | 348/211.3 |
| 2008/0045284 | A1* | 2/2008 | Assaad et al. | 463/9 |
| 2008/0077425 | A1* | 3/2008 | Johnson et al. | 705/1 |
| 2008/0284910 | A1* | 11/2008 | Erskine | G11B 27/11 348/468 |
| 2008/0301317 | A1* | 12/2008 | Lee | H04L 29/06027 709/231 |
| 2009/0003600 | A1* | 1/2009 | Chen et al. | 380/217 |
| 2009/0006192 | A1* | 1/2009 | Martinez | G06Q 30/02 705/14.69 |
| 2009/0021585 | A1* | 1/2009 | Ko et al. | 348/184 |
| 2010/0058220 | A1* | 3/2010 | Carpenter | G06Q 30/02 715/772 |
| 2010/0232518 | A1* | 9/2010 | Coleman, Sr. | H04N 7/181 375/240.26 |
| 2011/0119716 | A1* | 5/2011 | Coleman, Sr. | H04N 7/181 725/62 |
| 2011/0276712 | A1* | 11/2011 | Narula | H04L 65/4092 709/231 |
| 2012/0072961 | A1* | 3/2012 | Marignan | H04N 7/17318 725/109 |
| 2012/0266060 | A1* | 10/2012 | Roberts | G06F 17/30905 715/234 |
| 2013/0286211 | A1* | 10/2013 | Cao | H04N 7/181 348/159 |
| 2014/0122664 | A1* | 5/2014 | Clarke | H04L 65/605 709/219 |
| 2014/0143437 | A1* | 5/2014 | Mathur | H04N 21/2187 709/231 |
| 2014/0281007 | A1* | 9/2014 | Lemmons | H04N 21/2355 709/231 |
| 2016/0078449 | A1* | 3/2016 | Banerjee | G06Q 30/016 705/304 |
| 2016/0280734 | A1* | 9/2016 | Moore | B01J 14/00 |

OTHER PUBLICATIONS

CN 102023860 A; Apr. 20, 2011; English Translation.*
How to Add a YouTube Video to Your Web Site; HtmlGoodies; May 14, 2010; pp. 1-2.*
Web Developer 101: Embedding Video into Your Web Site; HtmlGoodies; Jul. 7, 2010; pp. 1-2.*
The Basics of Web Video File Formats and Video Containers; Feb. 28, 2010; Lorraine Grula; REELSEO; pp. 1-3.*

* cited by examiner

METHOD AND APPARATUS FOR LIVE CAPTURE IMAGE-LIVE STREAMING CAMERA

CROSS REFERENCE OF RELATED APPLICATION

This is a Continuation-In-Part application that claims the benefit of priority under 35 U.S.C. §119 to a non-provisional application, application Ser. No. 12/583,299, filed Aug. 17, 2009.

BACKGROUND OF THE PRESENT INVENTION

Field of Invention

The present invention relates to a method and apparatus for image capture, and more particularly to a live image capture device which output is directly accessible by Internet users without the installation of proprietary software.

Description of Related Arts

Live image capture devices, commonly known as cameras, are used to record images. These images can then be perused in situations with a different time and place than where the image was taken. Because of these benefits and the advances in technology that have made cameras ubiquitous and available to most of the general public, cameras are widely used in modern society.

An example of the prevalence of cameras is the wide usage of cameras for security by both public and private institutions. In a scenario where an area needs to be continuously be monitored, cameras are often more suited for the job than humans, since images are recorded onto a hard medium and are viewable by others as long as the medium is maintained.

However, a camera by itself will most likely have just one function—capturing the image. One or more controllers must be employed to collect the data that is produced by the camera. In complex systems involving a multitude of cameras, the amount of resources required to maintain such a system increases significantly, and thus places limits on the efficiency of the system based on the available resources of the system's operator.

In such a system, high costs are accrued through the installation of the system itself. In a typical operation involving the installation of the system, the controller needs to be installed and secured. Then, the cameras themselves need to be installed in their respective positions, and a path of data transfer must be established between the cameras and the controller. Then, the interface of the system needs to be modified and adjusted to suit the operator's specifications, and so forth. This system cannot be very easily modified, and thus is limited in terms of flexibility.

The application of such systems is also limited by the medium upon which data is exchanged between the cameras and the controllers. Many existing camera-controller systems utilize wired networks in order to transfer data between the two. A well-known example of this is CCTV, where a signal from a camera is not openly transmitted, but broadcast to authorized controllers within the system. More modern systems employ Ethernet networks, such as the Internet, to transfer data.

Using the Internet protocol is highly advantageous, since most electronic devices today can in some way interact with this method of data transfer. However, the rate of data transfer in current systems is bottlenecked by the physical layer of the network infrastructure provided by the network service provider. An example of this is the fact that the current most popular network carriers, DSL and Internet cable, are only capable of uploading 1.5 Mb/s at maximum, which is hardly enough to transfer a high quality, high resolution video stream without delay.

A conventional way of solving this problem has been the act of video compression. This method has been widely used, but is not without its drawbacks. First, in order to compress video images transmitted by a camera, developers must create algorithm and codes for compression. This results in the creation of a plethora of compression codes, most incompatible with each other, in the market today.

Even when compression codes are relatively similar, minor differences in compression code from different providers can result in incompatibility. Consumers wishing to view electronic media must often face the daunting task of finding the correct decoding codec to match the code that the media was compressed with.

Another issue is currently used live video format is not editable. It is difficult to edit the display when the image is displayed lively.

Regarding the issues relating to current methods of image capture and transfer, there appears to be a need for the direct capture and transfer of images through a network.

SUMMARY OF THE PRESENT INVENTION

The present invention involves a method and apparatus for the live capture of images and the direct transfer of the aforementioned electronically through an Internet network.

The present invention integrates a control circuit apparatus onto the motherboard of an image capture device. The onboard control circuit apparatus receives data from the image capture device, and converts the data into a standard format. The control circuit apparatus also acts as built-in a web server, providing a network interface to connect with the Internet, and continuously updates itself with new data transmitted from the image capture device. Users can then use the Internet to directly access the data from the image capture device by accessing the web server provided by the control circuit apparatus.

The present invention presents a method to transfer image information. When the image capture device records an image, the control circuit apparatus transfers the image data onto its own web server directly. Thus, this eliminates the need for an intermediate network between the camera itself and the controller. The control circuit apparatus will also contain an interface for modification of data transmittance, adjustable to the operator's specifications.

In order to avoid format incompatibility, the web server only transfers still image files in standard formats (such as JPEG, PNG, GIF, et cetera), and thus frees both the server- and user-side operators from the process of compression. Movement, or video, is simulated by the transfer of multiple still image files over a short interval of time.

The main object of the present invention is to provide a method and apparatus for an image capture device that is accessible in real-time.

Another object of the present invention is to provide a method and apparatus for live capture image which is easy to be connected with a network.

Another object of the present invention is to provide a method and apparatus for live capture image which doesn't does not require a separate controller.

Another object of the present invention is to provide a method and apparatus for live capture image which is easy to install.

Another object of the present invention is to provide a method and apparatus for live capture image which reduces the required resources to install the method and apparatus itself.

Another object of the present invention is to provide a method and apparatus for live capture image which is convenient to operator.

Another object of the present invention is to provide a method and apparatus for live capture image which is remote controllable.

Another object of the present invention is to provide a method and apparatus for live capture image which supports simultaneous viewing of multiple channels.

Another object of the present invention is to provide a method and apparatus for live capture image which provides high quality live images.

Another object of the present invention is to provide a method and apparatus for live capture image which image is editable.

Another object of the present invention is to provide a method and apparatus for live capture image which reduces the amount of required storage media to hold output data.

To accomplish the above objects, the present invention provides an apparatus for live capture image accessible though a network, comprising:

a housing;

an image capture device for capturing image information;

a control circuit electrically connected with the image capture device and communicatively connected with the network for converting the image information captured by the image capture device into predetermined image data and transferring the image data through the network, wherein the image capture device and the control circuit are received by the housing.

The present invention also provides a method for capture live image, comprising steps of:

(a) frequently capturing live image information with a predetermined capture interval by one or more live image providers;

(b) converting the live image information to a still image file in a web based viewable format;

(c) continuously transferring the converted still image files to a platform via Internet; and (d) obtaining the converted still image files at the platform to form a real time video like image at a predetermined frame rate by continuously overwriting the previous live image information with the latest live image information, so as to allow web browsers to watch the real time video like image without any proprietary software.

These and other objectives, features, and advantages of the present invention will become apparent from the following detailed description, the accompanying drawings, and the appended claims.

DETAILED DESCRIPTION OF THE PREFERRED EMBODIMENT

Figure 1:
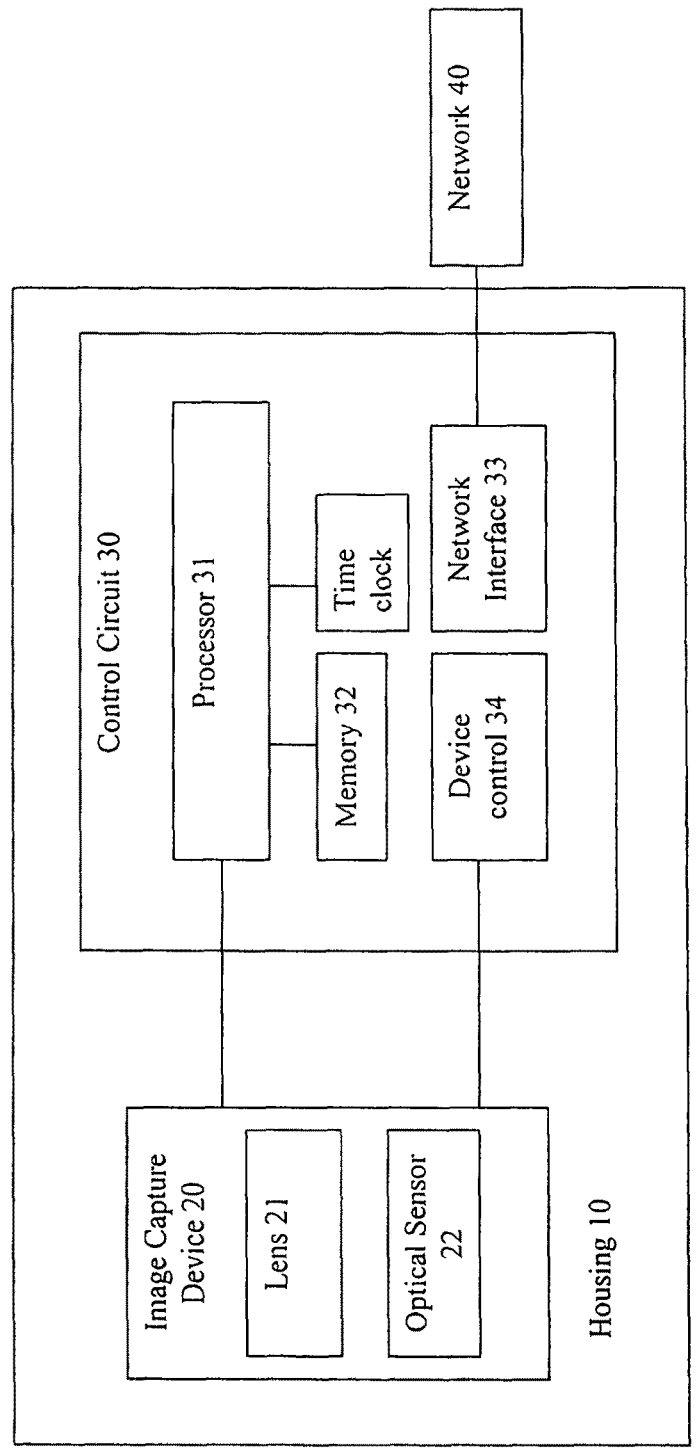
FIG. 1 is a schematic view of a live capture image apparatus according to a preferred embodiment of the present invention.
Figure 2:
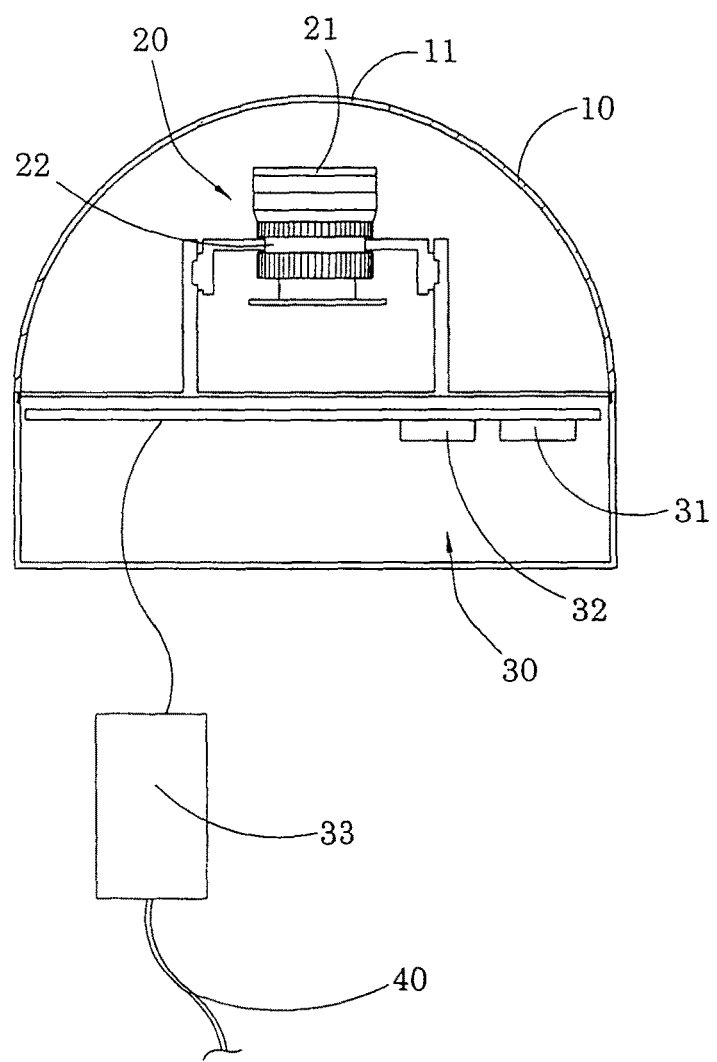
FIG. 2 is a sectional view of a live image provider according to the above preferred embodiment of the present invention.

The present invention provides an apparatus for live capture image which is able to communicate with internet directly. Referring to FIGS. 1 and 2 of the drawings, a preferred embodiment of the present invention is illustrated, wherein an apparatus for providing live image, which is a live image provider, comprises a housing 10, an image capture device 20, and a control circuit 30.

The housing 10 is adapted for securely mounting at a predetermined location to securely receive the image capture device 20 and the control circuit 30. Referring to FIG. 2, the housing 10 thoroughly covers the image capture device 20 and the control circuit 30 to provide protection. Therefore, the sensitive components such as the image capture device 20 and the control circuit 30 are able to work normally in a large range of environment. The housing 10 also comprises a window 11 made of transparent material in front of the lens 21 of the image capture device 20, so light can transfer through the window 11 to reach the lens.

The image capture device 20 is adapted to capture image information and converts the captured image information into electronic signals. Preferably, an image capture device 20 comprises a lens 21 to capture light waves from a predetermined area, and an optical sensor 22 to convert the light waves into electronic signals. The electric signals can be transferred and processed later to reproduce the image by display devices, such as a computer monitor.

The image can be captured in different manners for different purposes. The image capture device 20 may take snapshot, which means capturing only one slide of image in a predetermined period of time. The image capture device 20 may take video, which means capturing a serial of slides of image in a short period of time, or in other words, taking snapshots continuously and frequently with short snapshot interval. Depending on the requirement, the image capture device 20 is able to provide different numbers of slides of image with different intervals.

Many techniques are appreciated to be applied in the image capture device 20 by whom skilled in the art. The embodiment of the present invention preferably utilizes but not limited to CCTV (Closed Circuit Television). In an alternative embodiment of the present invention, the apparatus for live capture image comprises more then one image capture devices to provide multiple channels of images. Therefore the user can accept multiple images simultaneously or alternatively.

The control circuit 30 comprises a processor 31, a memory 32, and a network interface 33. The control circuit 30 is electrically connected with the image capture device 20 to receive the electronic signals produced by the image capture device 20. The signals are converted into predetermined format, which is a web based viewable format, by the processor 31. The file format includes image file such as JPEG, and video file such as MJPEG, MP4, FLV, and MPEG . . . . These files are stored in the memory 32. In a preferred embodiment, the image capture device 20 takes snapshots continuously and frequently with predetermined snapshot interval and resolution. The control circuit 30 converts the information of the snapshot into JPEG image files continuously and frequently and stores the image file in the memory 32. It is worth mentioning, the memory 32 is always refreshed by the latest image file, which means only the latest image file is saved in the memory 32, and the previous image file is overwritten. In this manner, only a small size of memory is need which saves the cost.

The control circuit 30 is also communicatively connected with a network 40, preferably the internet. Therefore the control circuit 30 is able to transfer image data via the network, and receive information, such as control information for the user via the network. In a preferred embodiment of the present invention, the network interface 33 is connected with internet via TCP/IP protocol.

The control circuit comprises a device control 34 operatively linked to the image capture device 20 for selectively adjusting the capture interval and resolution of the image capture device through the network 40.

The control circuit 30 also provides a web server function. When the network interface 33 is communicatively connected with the internet, the control circuit 30 runs a program which accepts HTTP requests from users such as web browsers, and provides HTTP serving responses along with data contents which is the image and video data.

In a preferred embodiment, the web server provided by the control circuit 30 acquires an IP address from the internet provider. Then the web server maps the path component of a URL (Uniform Resource Locator) to this IP address. When the user's web browser requests to visit this URL, the web server will then read the memory 32 of the control circuit 30 where the image data is stored, and send the data to the web browser. In this way the user's web browser is able to download the image data to display. It is worth mentioning, the image file is saved at the root direction of the HTTP web server.

In the preferred embodiment of the present invention, when the user's web browser is linked with the web server provided by the control circuit 30 via Internet, the web server then transfers the existing image file from the memory 32 to the web browser. Since the image file already exists, which is static content, the transferring is much faster than transfer dynamic content such as a video file. Also, the web server transfers the image file continuously and frequently without further request from the web browser, it also improves the transferring speed. Because the image file stored in the memory 32 is always refreshed continuously and frequently, the web browser will continuously and frequently receive the most updated image and display these file continuously with the video effect. Therefore, live image is able to be accessed by a web browser from internet.

Because every apparatus for live capture image of the present invention is working independently, each web server of the apparatus obtains an IP address and is able to be connected with internet individually. Therefore, a plurality of apparatus for live capture image of the present invention can be networked together to provide multiple channels images.

The web server of the control circuit 30 is also able to receive commands from the user's web browser for controlling. In the preferred embodiment, the control comprises using an integer to select channel, using a Boolean to enable/disable the image capture device 20, and using a float to set the snapshot interval.

In an alternative embodiment, the control circuit 30 is connected with more than one image capture devices 20 to provide multiple channels of images. The channels can be selected by the user via network. The housing 10 comprises a plurality of units to receive the image capture devices 20 and the control circuit 30 individually.

Figure 3:
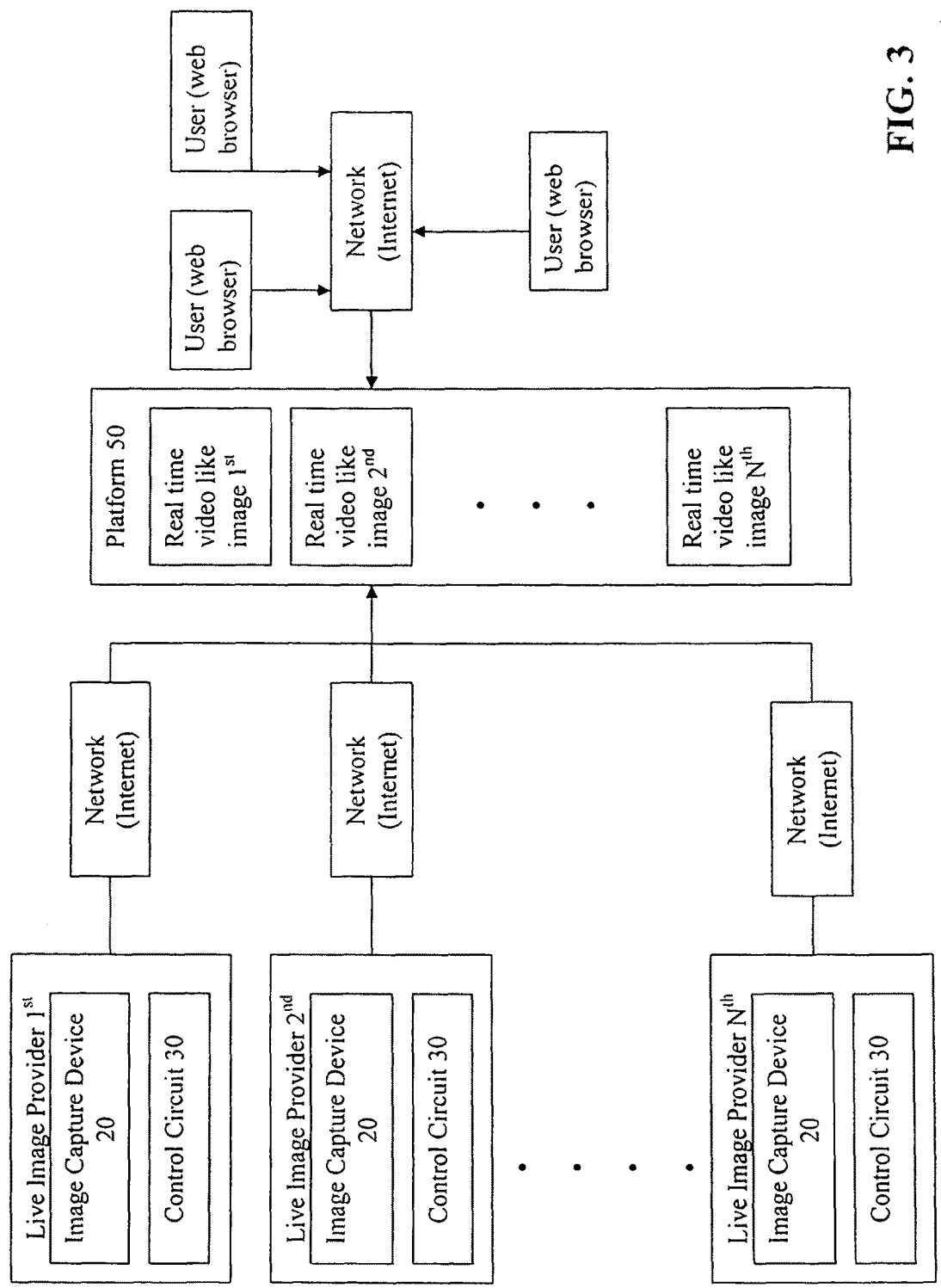
FIG. 3 is a schematic view of the live capture image system of the present invention.

The present invention also provides a web based system to broadcast multiple channels of images. Referring to FIG. 3, the system comprises a platform 50 to communicatively link with one or more live image providers through Internet which is one of the networks as mentioned above. The platform 50 collects live images from the live image providers via Internet, and presents these live images to observers via Internet. The live image provider captures live image, convert the image information into real time videos in predetermined format, and transfer the image data to the platform 50 via Internet. In a preferred embodiment of the present invention, the platform 50 is a web based platform that the web browsers can access the platform 50 through Internet.

In a preferred embodiment of the system, the image capture device 20 of the live image provider takes snapshots frequently with a predetermined interval. The control circuit 30 of the live image converts the snapshots into image file, and uploads the image file constantly to the platform 50 via the internet. The image data is preferably in the format of still image file, such as JPEG file, PNG (Portable Network Graphic) file, GIF file, etc. These formats are standard formats which are supported by most web browsers, therefore the web user doesn't need to install any extra decoding program to view these images.

The snapshot interval of the image capture device 20 of the live image providers can be set by the user. The quality or resolution of each image file is also adjustable in responsive to the speed of Internet. In this way the user can control the data streaming. For example, when the transferring rate of the internet is high, and/or not many live image providers are uploading image files, the resolution of the image file may be higher for a better description of features. Also, the snapshot interval or the uploading interval could be shorter to provide smoother active effect of the live image. On the other hand, when more live image providers are connected with the platform 50 and the data transferring via the internet is heavier, a lower resolution, as well as a longer interval (lower frame rate) could be employed by the live image providers.

The live image provider may comprise more than one image capture device 20 to provide multiple channels of live images. These channels can be enabled or disabled by the user. The images of these channels can be transferred together or individually.

The memory 32 of the live image provider is used to store the image file. In a preferred embodiment, only the latest image file is saved, and the previous image file will be replaced by the most updated one. This will save a lot memory space. In an alternative embodiment, all image files are saved in the platform 50. The live image provider always uploads the latest image file to the platform 50 for updating.

The platform 50 is first communicatively connected with the live image provider through the internet. Then the platform 50 receives the uploaded image files from the live image provider. The platform 50 is able to connect with one or more than one live image providers. Because the connection is through internet, the live image providers can be distributed in any location with the access of internet. The connection is also controllable. Only authorized live image providers are allowed to be connected with the platform 50, which is also called registration of the live image providers. The platform 50 is also adapted to enable/disable particular live image providers and channels of the live image providers. The control also includes setting configures of each channels and live image provider such as snapshot interval and resolution, and security management.

Then the platform 50 presents the image file to show the live images provided by the live image providers, preferably in a web page. In the web page, the platform 50 display the most updated images received from each live image provider continuously. Since the images files are uploaded frequently and constantly with a relatively small interval, the displayed images are frequently refreshed which provides a real video image on the web page. When the user browses this web page, the user can watch those videos provided by those live image providers which are connected with the platform 50.

Accordingly, the frame rate of the real time video like image is adjustable by the platform 50 and is selectively controlled in responsive to the capture interval of each of the live image providers. In particularly, the frame rate of the real time video like image is selectively adjusted in responsive to a refreshing time interval of the converted still image file at the platform 50 to obtain the latest converted still image files. For example, when the refreshing time interval of the converted still image file at the platform 50 is set at 3 seconds, the frame rate of the real time video like image is selectively adjusted at 1 frame per 3 seconds. It is worth mentioning that the capture interval of the live image provider can be set at any desired time interval. For example, when the frame rate of the real time video like image is set at 1 frame per 3 seconds while the capture interval of the live image provider is set at 1 frame per second, two still image frames, i.e. the second and third still image frames, from the live image provider will be useless and will not be shown on the platform 50. Preferably, the frame rate of the real time video like image is set as the capture interval of the live image provider for optimum performance. Since the frame rate of the real time video like image is relatively low, such as 1 frame per second, in comparison with the frame rate of the video, such as 30 frames per second, the platform 50 can enhance the smoothness of the real time video like image in a real time manner. In addition, since the capacity of the still image is relative small, the still image can be instantly updated to the platform 50 to minimize the time delay of transferring.

The platform 50 also controls the access of the web page. Users or web users need to be identified to access selected web pages which display live images from selected live image providers. The authorized user is able to interact with the platform 50 and the live image providers for setting. The user can select/unselect channels and live image providers, set the resolution and snapshot interval.

The system of the present invention is using still image file to transfer the image data. First, still image file has common and standard format. The platform 50 doesn't need to do the encoding which will take a lot of system resource. Therefore the processing speed is much faster then dealing with video format such as MJPG, MP4, H.264, etc. The cost of manufacturing the system is also reduced. Also, the web user doesn't need to install particular decoding program to display the live image. The standard still image file can be displayed by regular web browsers, and not extra system resource is needed. As a result, the processing speed is much faster in the system of the present invention, and there is no compatibility problem for the web users. Second, since the size of the still image file is small compare with a video file, both the live image provider and the platform 50 can afford to save these file for record. This is very useful for many applications. Third, the system is highly controllable. The performance of the system is flexible to fulfill the requirement of any application. Because the capability of the Internet on physical layer is limited and uncontrollable by the user, the system of the present invention provides flexibility on the application layer.

Because of all the advantages, the system of the present invention is powerful and flexible in web based applications, especially when a large number of image channels are involved. For example, if the snapshot interval is 3 second, the size of each still image file is 70 K (kilo byte), then more than 100 different live images as the real time video images can be displayed together simultaneously. At the same time, the web browser doesn't need to install any extra program, the image resolution is acceptable without compression and losing frame.

It is worth mentioning that the live image provider is preferred to be the apparatus for providing live image as it is mentioned above. However, the live image provider can be CCTV or a mobile phone having a built-in camera such that the CCTV or a mobile phone can capture the still image and upload to the platform 50 to form the real time video like image thereon. In addition, the web browser is able to access the platform 50 to watch the real time video like image by using mobile phone, PDA, computer or other electronic devices which is able to communicatively link to the platform 50 through "WiFi", Internet, or other communication network.

It is worth mentioning, using still image files also enable the platform 50 to edit and modify the live images to provide an add-on information for the live image files. Generally, for live videos, it is difficult to edit of modify the image on real time. But for still image files, for example PNG file, it is convenient to modify the image when display. Accordingly, the add-on information can be the comment or description of the image that adds onto the live image files. This provides the web server a great flexibility such as adding useful information on the live images.

Figure 4:
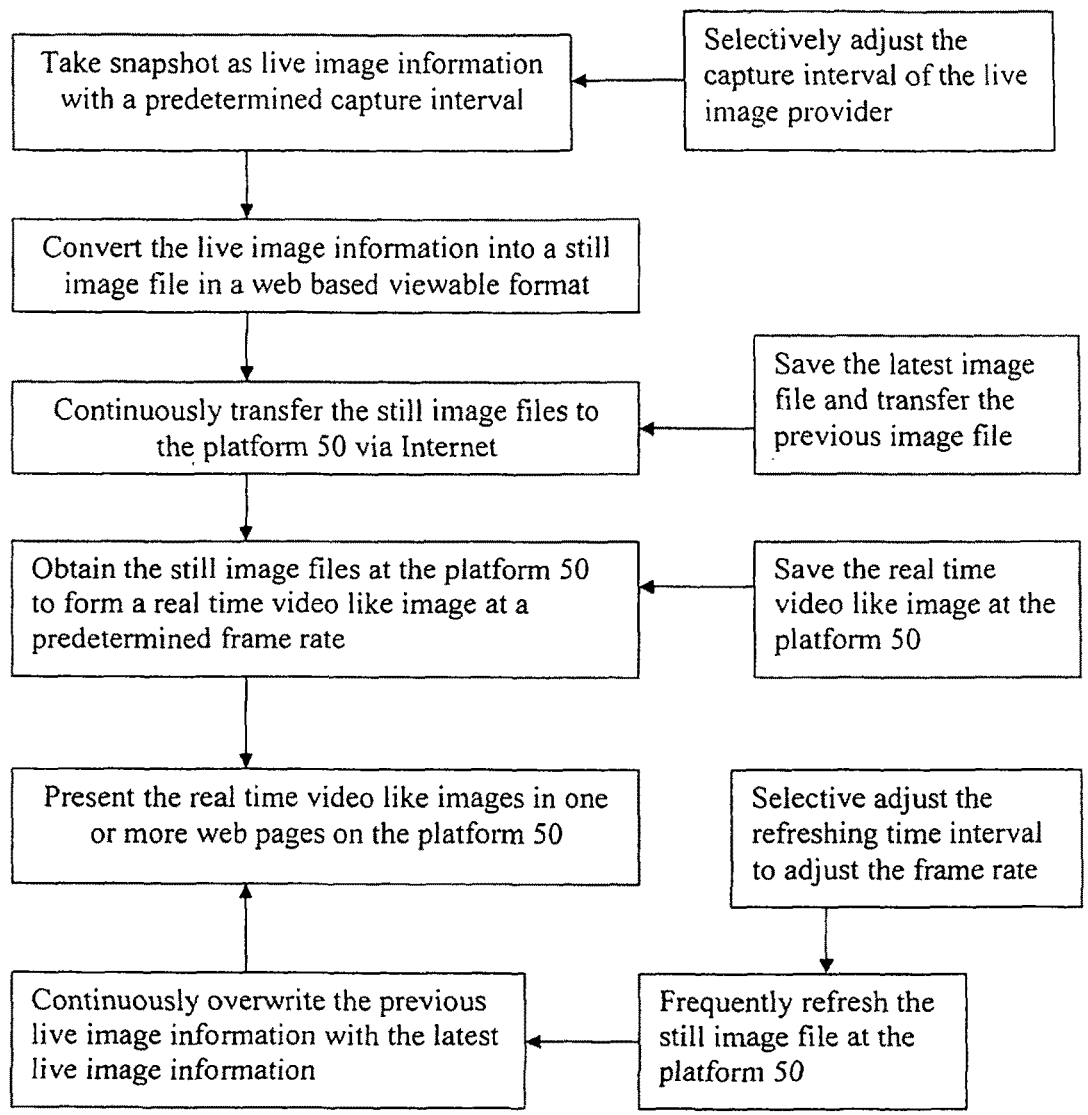
FIG. 4 is a flow chart of the method for transferring live images according to the above preferred embodiment of the present invention.

Referring to FIG. 4, the present invention provides a method for transferring live images via internet comprising the following steps.

(1) Frequently capture live image information with a predetermined capture interval by one or more live image providers.

(2) Convert the live image information to a still image file in a web based viewable format.

(3) Continuously transfer the converted still image files to a platform via Internet.

(4) Obtain the converted still image files at the platform to form a real time video like image at a predetermined frame rate by continuously overwriting the previous live image information with the latest live image information, so as to allow web browsers to watch the real time video like image without any proprietary software.

Figure 5:
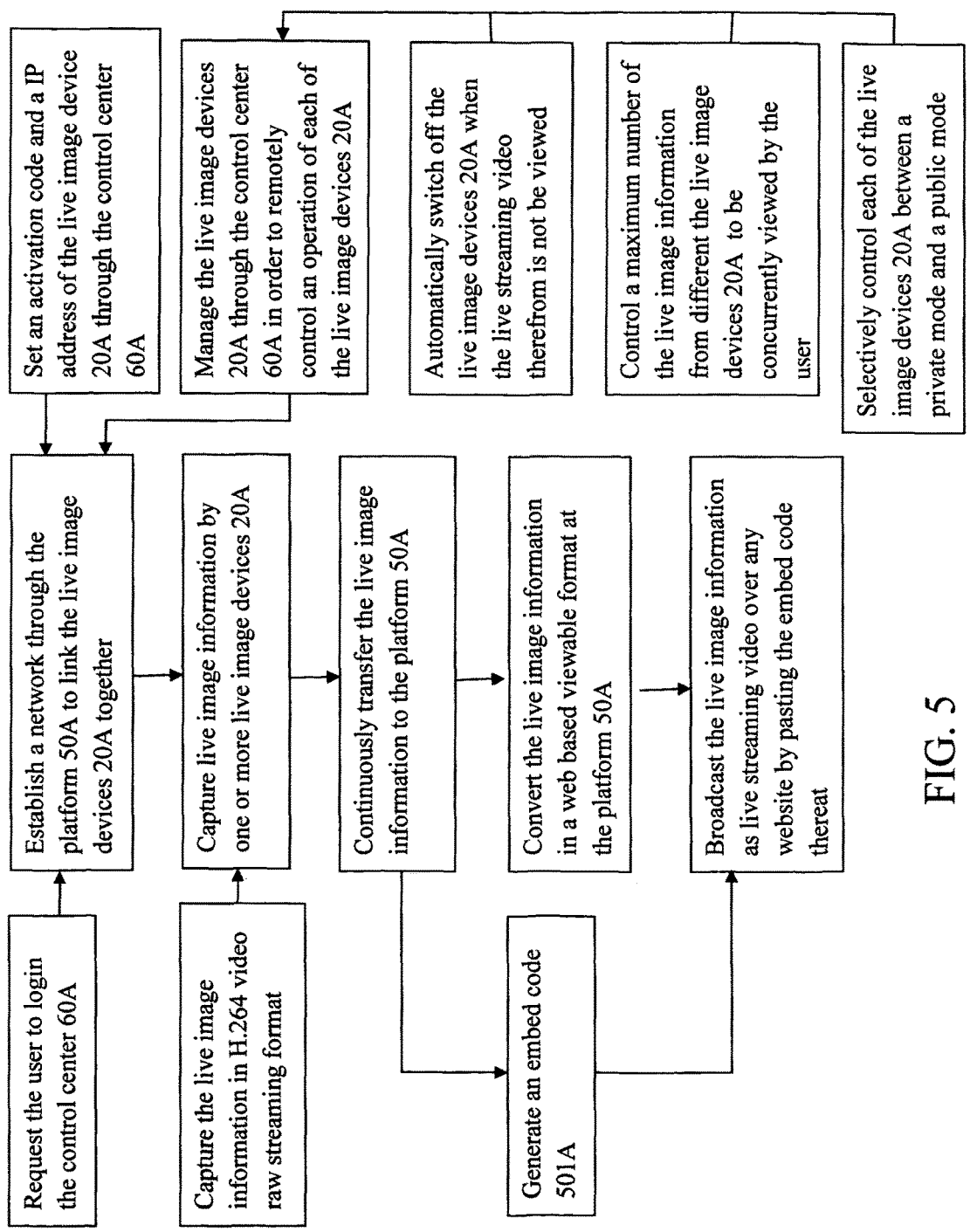
FIG. 5 is a flow chart illustrating the live images transferring system according to a second embodiment of the present invention.

As shown in FIG. 5, the present invention further provides a method for transferring live images comprising the following steps.

(1) Capture live image information, such as a video, by one or more live image devices 20A.

(2) Continuously transfer the live image information to a platform 50A via communication network, such as Internet.

(3) Clone the live image information in a web based viewable format at the platform 50A.

(4) Broadcast the live image information as live streaming video over any web browser without any proprietary software, such that a user of the platform 50A is able to concurrently view multiplicity of the live image information from the different live image devices 20A.

According to the preferred embodiment, the user is able to view any one of the live image information anywhere through Internet. For example, the user is able to use personal computer with its operation system such as "Window®", "Linux®", or Mac®, to access one or more of the image capture devices 20A in order to view the live image information. In addition, the user is able to use mobile phone, preferably supports Flash player" to view the live image information.

In other words, the user is requested to enter the platform 50A in order to allow the user to view the live image information through the web browser by an Internet-enabled device such as personal computer, smart phone, tablet computer, and PDA.

Figure 6:
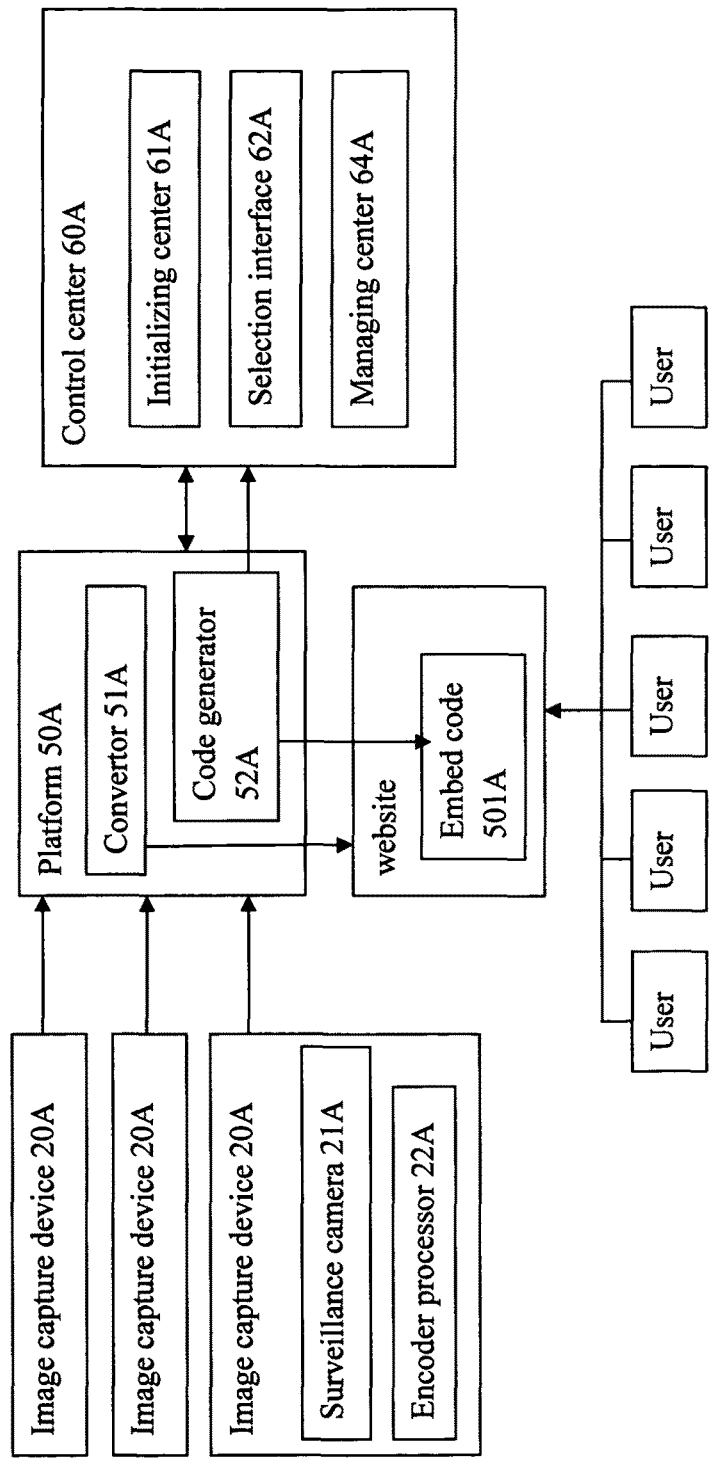
FIG. 6 is a block diagram illustrating the live images transferring system according to the above second embodiment of the present invention.

As it is mentioned above, the image capture device 20A is adapted to capture image information and converts the captured image information into electronic signals. Accordingly, the live image information is captured by the live image device 20A in H.264 video raw streaming format. As shown in FIG. 6, each of the live image devices 20A comprises a surveillance camera 21A with built-in IP address for capturing the live image information and an encoder processor 22A operatively linked to the surveillance camera 21A for encoding the live image information in H.264 video raw streaming format.

According to the preferred embodiment, the platform 50A is communicatively linking with the live image devices 20A through Internet, wherein the platform 50A can be a website or a server for the user to access through Internet.

In the step (3), when the live image information is cloned at the platform 50A, the live image information is converted from the raw format into the web viewable format and an embed code 501A is generated corresponding to the live image information at the same time. Preferably, the platform 50A comprises a converter 51A for converting the live image information from RTSP form to RTMP form through the platform 50A, and a code generator 52A linked to the converter 51A for generating the embed code 501A at the same time when the live image information is converted.

When the live image information is captured by the live image device 20A, the live image information is transferred to the platform 50A in RTSP (Real Time Streaming Protocol) form. Accordingly, the live image information is transferred to the platform 50A through TCP/UDP before and after the live image information is converted at the platform 50A. In other words, after the conversion, the live image information can be viewed by any web-based browser. In particular, the converter 51A will transform the live image information into the RTMP (Real Time Messaging Protocol) form. It is worth mentioning that the live image information in different video formats can be transferred to the platform 50A and can be converted into different video formats by the platform 50A selected by the user.

At the same time, the embed code 501A is also generated concurrently by the code generator 52A. The embed code 501A is a html source code being uniquely generated in response to the live image device 20A and the platform 50A. For example, when the live image information is captured by one live image device 20A and is transferred to two different platforms 50A, two different embed codes 501A will be generated at the two platforms 50A. Likewise, when two different live image information are captured by two different live image devices 20A and are transferred to one platforms 50A, two different embed codes 501A will be generated at the platform 50A with respect to the two different live image devices 20A. Therefore, the embed code 501A is a unique code corresponding to the live image device 20A and the platform 50A.

Once the embed code 501A is generated, one or more users are enabled to use the embed code 501A in order to broadcast the live image information over any website without any proprietary software. In particular, the embed code 501A is a text code adapted to "copy-and-paste" to the website to link the live image information from the platform 50A to the website, especially the personal website of the user, so as to live-stream the live image information from the live image device 20A to the personal website.

Conventionally, only limited users can directly access and view the live image device 20 since the live image information is captured by the live image device 20A in H.264 video raw streaming format. First, since different manufacturers manufacture different types of live image devices 20A, the user must have a proper video media reader in order to view the live image information in such raw streaming format. Second, the live image device 20A does not contain a powerful software and/or hardware that strong enough for hundreds of users to view the live image information at the same time. Therefore, the present invention provides the platform as a link to clone the live image information and to enable hundreds of users to view the live image information at the same time.

Figure 7:
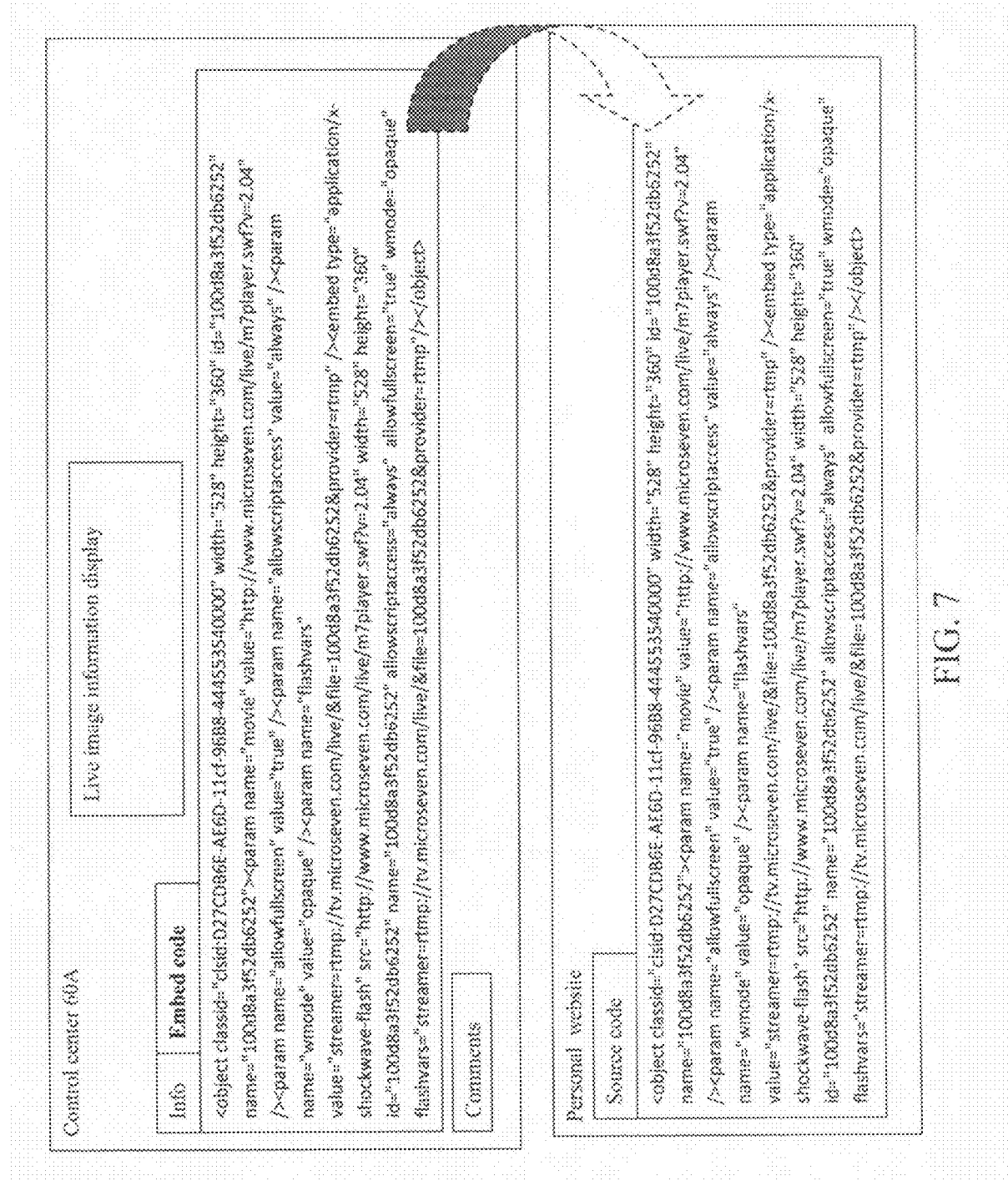
FIG. 7 illustrates the embed code being "copy-and-paste" from the control center to the personal website for broadcasting the live image information according to the above second embodiment of the present invention.

In addition, it is relatively complicated to link the live image information to the personal website in a conventional way. In other words, an additional software is a must to place the command of the live image information in order to link live image information to the personal website. On the other hand, the present invention simplifies the structure of the link that the user is able to "copy-and-paste" the embed code 501A to his or her personal website, as shown in FIG. 7, wherein the live image information will be automatically shown on his or her personal website in live broadcasting manner.

According to the preferred embodiment, the platform 50A is embodied as a software or a program adapted to be installed into a server owned by the user. The server can be linked to the live image device 20A by cable or in a wireless manner such as Internet. Therefore, the live image information can be transferred from the live image device 20A to the server and can be executed by the platform 50A.

The present invention further comprises a control center 60A communicatively linked to the platform 50A preferably by Internet. In particular, the control center 60A is a web-based station wirelessly linked to the platform 50A. Accordingly, the control center 60A provides an activation code to the platform 50A for activating the live image device 20A in order to transfer the live image information from the live image devices 20A to the platforms 50A in a live manner. In other words, without the activation code, the live image information will not be transferred from the live image device 20A to the platform 50A.

The control center 60A comprises an initializing center 61A for setting each of the live image devices 20A, wherein the initializing center 61A contains the activation code for identifying the corresponding live image device 20A to the platform 50A, and an input of a IP address of one of the live image devices 20A for identifying the location thereof.

Before accessing the platform 50A, the present invention preferably comprises the following installation steps.

(I) Install the live image device 20A, i.e. for personal use, setting up the IP address of the live image device 20A and RTSP port, wherein the IP address of the live image device 20A can be set as "192.198.1.201" as an example, and the RTSP port can be set as 554 as an example.

(II) Install accessing software as the platform 50A at the server or personal computer including inputting the activation code and the IP address of the live image device 20A in order to access the live image device 20A, wherein the software structures includes an executable binary file of the platform 50A, a media player of the platform 50A, and a live.html which is a webpage of checking video streaming and script code generated by the platform 50A. The live.html file includes an embed source having the code of the designated live image device 20A as the embed code 501A.

(III) Login the control center 60A to configure the live image device 20A.

Accordingly, two or more of the live image devices 20A can be linked together through the platform 50A to establish a network, wherein each of the live image devices 20A is adapted for being accessed through the platform 50A by the user to view the corresponding live image information. In other words, the user is able to access the platform 50A in order to select one or more live image devices 20A to view the live image information.

It is worth mentioning that the user is able to install the platform 50A into his or her server or personal computer that the user of the server or personal computer is able to obtain the activation code from the control center 60A. Once the input of the activation code, the platform 50A is automatically linked to the corresponding live image device 20A to receive the live image information.

In the step (I), when the live image device 20A is set up through a local area network (LAN), the server or personal computer will find the location of the live image device 20A through a locator once the live image device 20A is connected to a router through the local area network (LAN). Therefore, the information of the IP address, the port, device type, subnet mask, default gateway, and port forward corresponding to the live image device 20A will be displayed on the platform 50A.

Then, in the step (II), by downloading the software from the control center 60A to the server or personal computer, the platform 50A will be set up in the server or personal computer. The user is able to input the above information of the live image device 20A through the set up process, such as inputting the activation code and the IP address of the live image device 20A.

In the step (III), the user, i.e. the owner of the live image device 20A, is able to login the control center 60A in order to configure the live image device 20A.

It is worth mentioning that the control center 60A can track the live image information through the embed code 501A. In particular, the control center 60A is able to keep track which platform 50A being used for broadcasting the live image information because the embed code 501A is placed to the platform 50A. In addition, the control center 60A is able to obtain the numbers of viewers viewing the live image information from the platform 50A. Therefore, the numbers of viewers will be shown in the control center 60A to illustrate how many times the live image information from the live image device 20A being viewed from the particular platform 50A. In addition, the control center 60A further provides a comment list placed below the live image information display for the viewers to leave any comment regarding the live image information. The control center 60A will control the comments left by the viewers when any junk or impolite comment is left, the control center 60A will remove such comment from the comment list and will prohibit any comment being left by the corresponding viewer.

Figure 8:
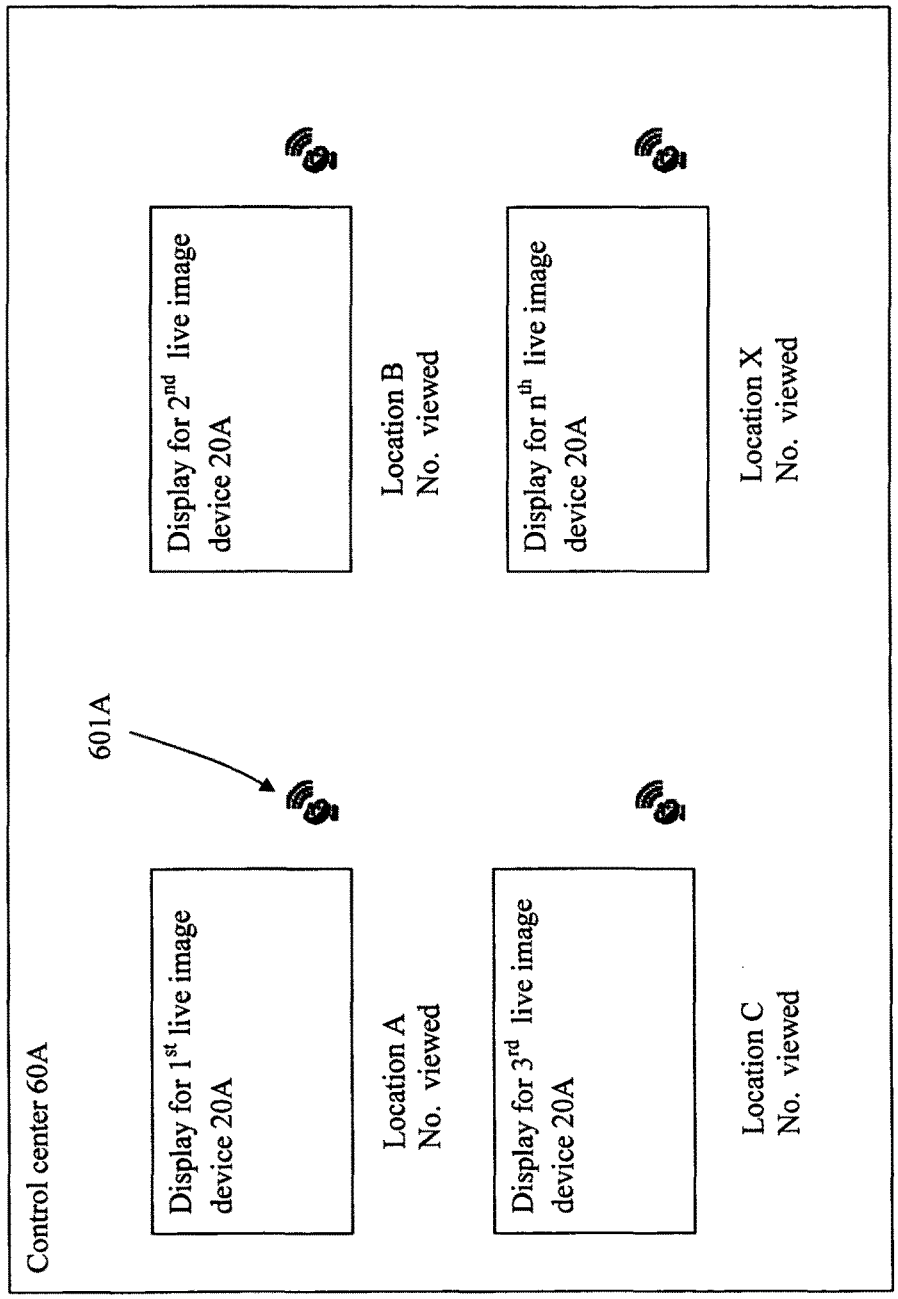
FIG. 8 illustrates an interface of the control center of the system according to the above second embodiment of the present invention.

As shown in FIG. 8, the control center 60A further indicates the connection status of the live image device 20A and/or the platform 50A. A connection indicator 601A is shown on the control center 60A next to the display of the live image information that when the connection indicator 601A shows when there is the connection between the live image device 20A and the platform 50A, the live image information will be shown on the display in live manner. When the connection indicator 601A shows when there is no connection between the live image device 20A and the platform 50A, the control center 60A will be notified to troubleshoot the problem of the live image device 20A and/or the platform 50A.

The control center 60A provides a selection interface 62A for allowing the user to select multiple live image devices 20A to view more than one live image information. According to the preferred embodiment, each of the live image devices 20A is selectively controlled between a private mode and a public mode, wherein at the private mode, the live image information from the respective live image device 20A is adapted for being viewed by authorized user, and at the public mode, the live image information from any of the live image device 20A is adapted for being view by any user of the control center 60A.

The user, i.e. the owner of the live image device 20A is able to set the live image device 20A between the private mode and the public mode through the control center 60A. For example, when the live image device 20A is set to capture the image of the retail store, the user is able to set the live image device 20A at the public mode, such that other users are able to view the live image of the retail store through the owner's website. When the live image device 20A is set to capture the image of the store's entrance as the security camera, the user is able to set the live image device 20A at the private mode. Therefore, only authorized users, such as security guard, can view the live image from the live image device 20A. It is worth mentioning that an authorized code will be given by the control center 60A to the authorized users upon the request from the owner of the live image device 20A.

Accordingly, all the live image devices 20A are shown in the selection interface 62A. However, only the authorized user can access the live image devices 20A at the private mode. In other words, the authorized user can access the live image devices 20A in responsive to the authorized code from the control center 60A. In order to set the live image device 20A at the private mode, the user is able to select the corresponding live image device 20A as an authorized manner such that other users cannot access the authorized live image device 20A without any permission. Other users can access the authorized live image device 20A by invitation of the authorized user.

In the step (III), the user is able to obtain the embed code 501A from the control center 60A, wherein the user is able to copy the embed code 501A from the control center 60A to his or her personal website for broadcasting the live image information. It is worth mentioning that the user is able to view the live image information at the control center 60A as well to configure the live image device 20A. In addition, having the embed code 501A can be used as the source code for sharing the live image information.

It is worth mentioning that the embed code 501A forms a shortcut for the user to broadcast the live image information. No other software or particular command is required for the user to set up his or her personal website to link with the live image device 20A. Once the embed code 501A is placed, by pasting the text code of the embed code 501A, the live image information will be automatically displayed on the personal website.

For example, the live image device 20A is set up at Venice Beach at California for capturing the live image of Venice beach walk. The control center 60A will display the live image information of the live image device 20A with the info and the embed code 501A thereof. The user is able to "copy-and-paste" the embed code 501A from the control center 60A to the personal website as the source code such that the live image information of the live image device 20A will be automatically displayed at the personal website as shown in FIG. 7. Therefore, after the embed code is copied-and-pasted at the personal website, the live image information will live-streaming from the live image device to the personal website.

In addition, all information of the live image device 20A will be shown in the selection interface 62A, which includes the ID of the live image device 20A, the user ID of the live image device 20A, the IP address of the live image device 20A, the RTSP port of the live image device 20A, the speed rate (Bitrate in/out) of the live image device 20A, and the create date of the live image device 20A. The number of current view and total view of the live image device 20A will also be shown in the selection interface 62A.

It is worth mentioning that the selection interface 62A can be personalized by the user that only the information of the designated live image devices 20A will be shown in the selection interface 62A. Since thousands of live image devices 20A will be installed at different locations, the user is able to select the designated live image devices 20A in the selection interface 62A in order to view the live image information. The user can always add or delete the live image devices 20A in the selection interface 62A.

According to the preferred embodiment, the control center 60A further provides multi-functions including PTZ (Pan-Tilt-Zoom) control of the live image device 20A, preset point recall, and volume control, in order to control the live image device 20A with audio steaming. Thus, the live image device 20A can be controlled with snapshot ability, snapshot image quality, record the live image information, and configure the recorded file (query, play, delete, and download) through the control center 60A.

The user is able to setup only one live image device 20A, i.e. the single live image device version, using it in purely LAN. Accordingly, the accessing software can be firstly installed inputting the activation code and the information of the live image device 20A, such as the IP address of the live image device 20A. Then, the platform 50A will automatically convert the live image information in raw H.264 from the live image device 20A into RTMP steaming. After the installation is finished, the user is able to open live.html and view the streaming video as the live image information from the corresponding live image device 20A. It is worth mentioning that the live.html page will automatically generate live image information streaming embedded scripts (html source code). Source code, i.e. the embed code 501A, can copy-paste to any webpage on any website, so as to provide flash streaming video over Internet.

For multiple live image device version, the accessing software can be firstly installed inputting the activation key and the information of the live image devices 20A, such as the IP addresses of the live image devices 20A. Then, the user must login to the control center 60A in order to register thereof. Therefore, the platform 50A will automatically convert the live image information in raw H.264 from the live image device 20A into RTMP steaming. Accordingly, a maximum number of the live image information from different live image devices 20A will be set by the control center 60A in order to allow the user to be concurrently viewed from the live image devices 20A. After the installation is finished, the user is able to view the streaming video as the live image information from the corresponding live image device 20A over any browser through Internet.

According to the preferred embodiment, the control center 60A further comprises a managing center 64A managing the live image devices 20A in order to remotely control an operation of each of the live image devices 20A in an authorized manner. As it is mentioned above, the live image device 20A can be controlled its PTZ (Pan-Tilt-Zoom) control, preset point recall, and volume control through the managing center 64A. In addition, through the managing center 64A, the user can add new live image device 20A, delete current live image device 20A, enable/disable the currently live image device 20A, share the live image device 20A (set to share or set to privilege), check and verify software version number, check and verify the maximum connection of the live image device 20A, check current live image device 20A connected, check total live image device 20A connected, check live image device 20A bit rate, view live image streaming video, automatically check embedded source code generated by the platform 50A to be able to copy-paste to any page on any website, and check log of the platform 50A.

Accordingly, the platform 50A of the preferred embodiment has the following bandwidth consume properties. The bandwidth equals to the sum of inbound bitrate and outbound bitrate. The inbound bitrate is a single channel that the platform 50A obtains raw RTSP streaming from the live image device 20A. The outbound bitrate is multiple channel that each user takes one channel. Therefore, the bandwidth consumption is related with the users viewing live information from the live image device 20A. In addition, the platform 50A will use one channel to obtain live image information such that one single channel read video contents and multiple users can view the same live image device 20A.

The platform 50A default set is not connected to any live image device 20A until the user requests to access thereof in order to view the live image information for energy saving. When on user on the website, the live image device 20A will be automatically switched off for energy saving. In other words, the control center 60A will automatically switch off one of the live image devices 20A when the corresponding live streaming video therefrom is not be viewed. It is worth mentioning that using RTMP port (default is 1935), multiple live image device version will be open communication port (default is 7000).

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for transferring live images, comprising steps of:
    (a) capturing live image information by one or more live image devices, wherein said live image information is captured in raw format and is continuously transferred to one or more platforms in a live manner, wherein said live image information is in a raw streaming format;
    (b) cloning said live image information at said platform, wherein when said live image information is cloned at said platform, said live image information is converted from said raw format into a web viewable format and an embed code is generated corresponding to said live image information at the same time, wherein said embed code is a unique code referring to said live image information, such that when two different live image information are captured by two different live image devices and are transferred to one platform, two different embed codes are generated at said platform with respect to said two different live image information; and
    (c) enabling one or more users to use said embed code in order to broadcast said live image information over any website, wherein said live image information is captured in said raw format and is converted from said raw format into a web viewable format for broadcasting said live image information at any website with said embed code pasted therein, wherein said live image information i is converted from real time streaming protocol ("RTSP") form to real time messaging protocol ("RTMP") form through said platform.

2. The method, as recited in claim 1, wherein said embed code is a Hypertext Markup Language ("html") source code being uniquely generated in response to said live image device and said platform.

3. The method, as recited in claim 2, wherein said live image information is transferred to said platform through either a transmission control protocol ("TCP") or a user datagram protocol ("UDP") before and after said live image information is converted at said platform.

4. The method, as recited in claim 3, wherein, in the step (c), said embed code is a text code adapted to "copy-and-paste" to said website to link said live image information to said website.

5. The method, as recited in claim 4, the step (a) further comprises the steps of: (a-1) linking said platform to a control center which is a web-based station; and (a-2) providing an activation code from said control center to said platform for activating said live image device in order to transfer said live image information from said live image device to said platforms in a live manner.

6. The method, as recited in claim 5, wherein said embed code is saved in said control center that said users must be authorized by to use said embed code at said control center for broadcasting said live image information over said websites of said users.

7. The method, as recited in claim 1, wherein said live image information is transferred to said platform through either a transmission control protocol ("TCP") or a user datagram protocol ("UDP") before and after said live image information is converted at said platform.

8. The method, as recited in claim 1, wherein, in the step (c), said embed code is a text code adapted to "copy-and-paste" to said website to link said live image information to said website.

9. The method, as recited in claim 8, the step (a) further comprises the steps of: (a-1) linking said platform to a control center which is a web-based station; and (a-2) providing an activation code from said control center to said platform for activating said live image device in order to transfer said live image information from said live image device to said platforms in a live manner.

10. The method, as recited in claim 9, wherein said embed code is saved in said control center that said users must be authorized by to use said embed code at said control center for broadcasting said live image information over said websites of said users.

11. The method, as recited in claim 10, further comprising a step of selectively controlling each of said live image devices between a private mode and a public mode by said control center, wherein at said private mode, only authorized user is able to view said live image information from said respective live image device, and at said public mode, any user of said control center is able to view said live image information from any of said live image device.

12. The method, as recited in claim 11, wherein the step (d) further comprises a step of controlling a maximum number of said live image information at said platform from said live image device to be concurrently viewed by said users.

13. The method, as recited in claim 12, further comprising a step of automatically switching off one of said live image devices when said live streaming video therefrom is not be viewed.

14. The method, as recited in claim 10, wherein the step (d) further comprises a step of controlling a maximum number of said live image information at said platform from said live image device to be concurrently viewed by said users.

15. The method, as recited in claim 10, further comprising a step of automatically switching off one of said live image devices when said live streaming video therefrom is not be viewed.

16. The method, as recited in claim 9, further comprising a step of selectively controlling each of said live image devices between a private mode and a public mode by said control center, wherein at said private mode, only authorized user is able to view said live image information from said respective live image device, and at said public mode, any user of said control center is able to view said live image information from any of said live image device.

17. The method, as recited in claim 1, the step (a) further comprises the steps of: (a-1) linking said platform to a control center which is a web-based station; and (a-2) providing an activation code from said control center to said platform for activating said live image device in order to transfer said live image information from said live image device to said platforms in a live manner.

18. The method, as recited in claim 17, wherein said embed code is saved in said control center that said users must be authorized by to use said embed code at one of said platform and control center for broadcasting said live image information over said websites of said users.

19. A live image system for transferring live images, comprising:
    one or more live image devices located at different locations for capturing live image information; and
    a platform communicatively linking with said live image devices for receiving said live image information from said live image device, wherein said platform comprises a cloning means for cloning said live image information at said platform, wherein when said live image information is cloned at said platform, said live image information is converted from said raw format into a web viewable format and an embed code is generated corresponding to said live image information at the same time, wherein said embed code is arranged for enabling one or more users to use said embed code in order to broadcast said live image information over any website without any proprietary software, wherein said live image information is captured in said raw format and is converted from said raw format into a web viewable format for broadcasting said live image information at any website with said embed code pasted therein, and wherein said raw format is raw streaming data, wherein said embed code is a unique code referring to said live image information, such that when two different live image information are captured by two different live image devices and are transferred to said platform, two different embed codes are generated at said platform with respect to said two different live image information, wherein said live image information is converted from real time streaming protocol ("RTSP") form to real time messaging protocol ("RTMP") form through said platform.

20. The system, as recited in claim 19, wherein said embed code is a Hypertext Markup Language ("html") source code being uniquely generated in response to said live image device and said platform.

21. The system, as recited in claim 20, wherein said embed code is a text code adapted to "copy-and-paste" to said website to link said live image information from said platform to said website.

22. The system, as recited in claim 21, wherein said live image information is transferred to said platform through either a transmission control protocol ("TCP") or a user datagram protocol ("UDP") before and after said live image information is converted at said platform.

23. The system, as recited in claim 22, wherein said cloning means comprises a converter for converting said live image information from real time streaming protocol ("RTSP") form to real time messaging protocol ("RTMP") form through said platform, and a code generator linked to said converter to generate said embed code at the same time when said live image information is converted.

24. The system, as recited in claim 23, further comprising a control center, which is a web-based station, operatively linked to said platform, wherein said control center provides an activation code to said platform for activating said live image device in order to transfer said live image information from said live image device to said platforms in a live manner.

25. The system, as recited in claim 24, wherein said embed code is saved in said control center that said control center is arranged for authorizing said users to use said embed code at one of said platform and control center for broadcasting said live image information over said websites of said users.

26. The system, as recited in claim 25, wherein each of said live image devices is selectively controlled between a private mode and a public mode by said control center, wherein at said private mode, said live image information from said respective live image device is adapted for being viewed by authorized user, and at said public mode, said live image information from any of said live image device is adapted for being view by any user of said control center.

27. The system, as recited in claim 26, wherein each of said live image devices is automatically switched off when said live streaming video therefrom is not be viewed.

28. The system, as recited in claim 27, wherein said control center further controls a maximum number of said live image information at said platform from said live image device to be concurrently viewed by said users.

29. The system, as recited in claim 25, wherein each of said live image devices is automatically switched off when said live streaming video therefrom is not be viewed.

30. The system, as recited in claim 25, wherein said control center further controls a maximum number of said live image information at said platform from said live image device to be concurrently viewed by said users.

31. The system, as recited in claim 24, wherein each of said live image devices is selectively controlled between a private mode and a public mode by said control center, wherein at said private mode, said live image information from said respective live image device is adapted for being viewed by authorized user, and at said public mode, said live image information from any of said live image device is adapted for being view by any user of said control center.

32. The system, as recited in claim 19, wherein said cloning means comprises a converter for converting said live image information from real time streaming protocol ("RTSP") form to real time messaging protocol ("RTMP") form through said platform, and a code generator linked to said converter to generate said embed code at the same time when said live image information is converted.

33. The system, as recited in claim 19, further comprising a control center, which is a web-based station, operatively linked to said platform, wherein said control center provides an activation code to said platform for activating said live image device in order to transfer said live image information from said live image device to said platforms in a live manner.

34. The system, as recited in claim 33, wherein said embed code is saved in said control center that said control center is arranged for authorizing said users to use said embed code at one of said platform and control center for broadcasting said live image information over said websites of said users.

* * * * *